US012755659B2

(12) United States Patent
Woo et al.

(10) Patent No.: US 12,755,659 B2
(45) Date of Patent: Oct. 6, 2026

(54) DISPLAY DEVICE INCLUDING MUX SIGNAL BLOCKING PART AND METHOD OF FABRICATING THE SAME

(71) Applicant: LG Display Co., Ltd., Seoul (KR)

(72) Inventors: Yoon-Hwan Woo, Paju-si (KR); Jung-Woo Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/037,055

(22) Filed: Jan. 24, 2025

(65) Prior Publication Data

US 2025/0273103 A1 Aug. 28, 2025

(30) Foreign Application Priority Data

Feb. 27, 2024 (KR) ........................ 10-2024-0028277

(51) Int. Cl.
*G09G 3/3275* (2016.01)
*G09G 3/00* (2006.01)
*G09G 3/3266* (2016.01)

(52) U.S. Cl.
CPC ........... *G09G 3/006* (2013.01); *G09G 3/3266* (2013.01); *G09G 3/3275* (2013.01); *G09G 2300/0426* (2013.01); *G09G 2300/0842* (2013.01); *G09G 2310/08* (2013.01); *G09G 2330/021* (2013.01); *G09G 2330/12* (2013.01)

(58) Field of Classification Search
None
See application file for complete search history.

(56) References Cited

U.S. PATENT DOCUMENTS 11,694,591 B2 7/2023 Hong et al.
2006/0274570 A1* 12/2006 Jeoung ................ G09G 3/3685 365/154
2014/0139413 A1* 5/2014 Kwon .................... H10K 59/88 345/82
2016/0379906 A1* 12/2016 Kim ...................... G09G 3/006 257/48
2018/0330653 A1* 11/2018 Zhou .................. G02F 1/13452
2020/0327834 A1* 10/2020 Kim ...................... G09G 3/006
2021/0201766 A1* 7/2021 Bong ................. H10K 59/1213
2022/0068727 A1* 3/2022 Seo ........................ G09G 3/006
2022/0208063 A1 6/2022 Hong et al.
2024/0071310 A1* 2/2024 Lee ...................... G09G 3/3291

FOREIGN PATENT DOCUMENTS

KR 10-2013-0104241 A 9/2013
KR 10-2022-0092133 A 7/2022

* cited by examiner

*Primary Examiner* — Nitin Patel
*Assistant Examiner* — Amen W Bogale
(74) *Attorney, Agent, or Firm* — Fenwick & West LLP

(57) ABSTRACT

A display device including a mux signal blocking part and a method of fabricating the same are disclosed. A display device includes: a timing controlling unit generating an image data, a data control signal and a gate control signal; a data driving unit generating a data signal using the image data and the data control signal; a gate driving unit generating a gate signal using the gate control signal; and a display panel displaying an image using the data signal and the gate signal and including a plurality of mux test lines, a plurality of mux enable transistors connected to the plurality of mux test lines, respectively, and a plurality of mux pads connected to the plurality of mux enable transistors, respectively.

20 Claims, 8 Drawing Sheets

DISPLAY DEVICE INCLUDING MUX SIGNAL BLOCKING PART AND METHOD OF FABRICATING THE SAME

CROSS-REFERENCE TO RELATED APPLICATION

The present application claims the priority of Republic of Korea Patent Application No. 10-2024-0028277 filed on Feb. 27, 2024, which is hereby incorporated by reference in its entirety.

BACKGROUND

Field of the Disclosure

The present disclosure relates to a display device, and more particularly, to a display device including a mux signal blocking part where a deterioration such as a line defect due to a coupling of a mux line and a film line is prevented by blocking an application of a mux signal to the mux line with the mux signal blocking part between a mux line and a mux pad and a method of fabricating the same.

Description of the Background

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

In the display device, to reduce a number of output terminals of a data driving units and a number of data link lines of a display panel, the data driving unit may sequentially output red, green and blue data signals to one data link line through one output terminal, and a plurality of data lines of the display panel may be connected to one data link line through a plurality of mux transistors. As a result, the red, green and blue data signals may be sequentially supplied to the plurality of data lines.

The mux transistor is switched according to a mux signal. Since a mux line transmitting the mux signal overlaps a film line of a flexible printed circuit, a coupling occurs between the mux line and the film line. The data signal is distorted due to the coupling of the mux line and the film line to cause a line defect such as a dark line.

SUMMARY

Accordingly, the present disclosure is directed to a display device that substantially obviates one or more of the problems due to limitations and disadvantages of the related art.

More specifically, the present disclosure is to provide a display device including a mux signal blocking part where deterioration such as a line defect due to a coupling of a mux line and a film line is prevented by disposing the mux signal blocking part selectively blocking a mux signal between the mux line transmitting the mux signal during a lighting test and a mux pad receiving the mux signal from a data driving unit.

Further, the present disclosure is to provide a display device where a coupling of a mux line and a film line is prevented, a power consumption is reduced and a relatively low power consumption is obtained by disposing a mux signal blocking part selectively blocking a mux signal between a mux line and a mux pad, by transmitting the mux signal during a lighting test through the mux signal blocking part and by blocking the mux signal after a data driving unit is attached.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a timing controlling unit generating an image data, a data control signal and a gate control signal; a data driving unit generating a data signal using the image data and the data control signal; a gate driving unit generating a gate signal using the gate control signal; and a display panel displaying an image using the data signal and the gate signal and including a plurality of mux test lines, a plurality of mux enable transistors connected to the plurality of mux test lines, respectively, and a plurality of mux pads connected to the plurality of mux enable transistors, respectively.

In another embodiment of the present disclosure, a method of fabricating a display device includes: forming a plurality of mux test lines, a plurality of mux enable transistors connected to the plurality of mux test lines, respectively, and a plurality of mux pads connected to the plurality of mux enable transistors, respectively, on a display panel; connecting a plurality of mux test pads of a test substrate to the plurality of mux test lines of the display panel by disposing the test substrate adjacent to the display panel; performing a lighting test of the display panel by turning on the plurality of mux enable transistors and applying a plurality of mux signals from the test substrate to the plurality of mux pads; connecting a plurality of mux film lines of a flexible printed circuit to the plurality of mux pads by attaching the flexible printed circuit to the display panel; and driving the display panel by turning off the plurality of mux enable transistors and applying a plurality of mux signals from the flexible printed circuit to the plurality of mux pads.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Figure 1:
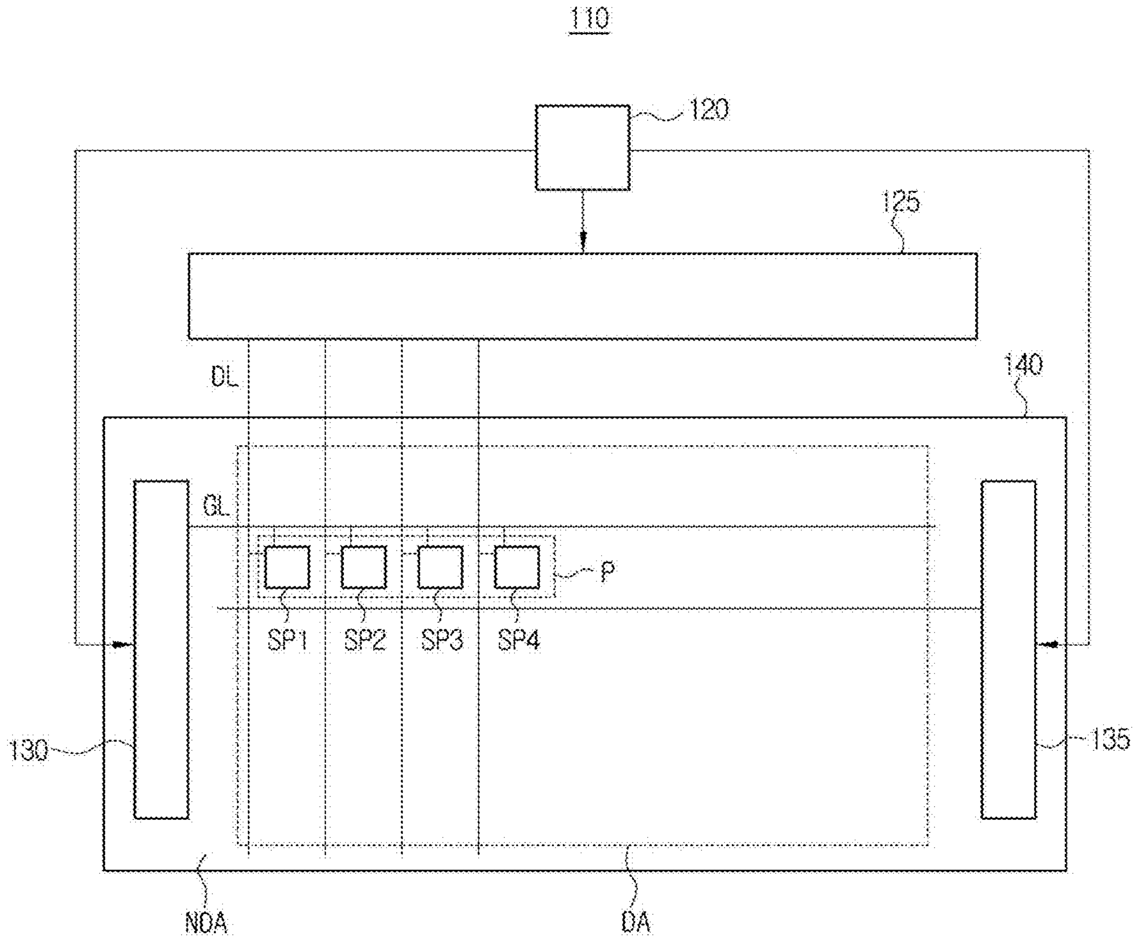
FIG. 1 is a view showing a display device according to an embodiment of the present disclosure. The display device may be an organic light emitting diode (OLED) display device.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example aspects of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" may include a display device in a narrow sense such as liquid crystal module (LCM), an organic light emitting diode (OLED) module and a quantum dot (QD) module including a display panel and a driving unit for driving the display panel. In addition, the term "display device" may include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving unit may be expressed as "a display device", and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control unit for driving the display panel, and a set device may further include a set PCB of a set control unit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or oxygen into the emitting element layer. In addition, the emitting element layer on the array may include an inorganic light emitting layer, for example, a nano-sized material layer or a quantum dot.

The thin film transistor of the present disclosure may include one of an oxide thin film transistor, an amorphous silicon thin film transistor, and a low temperature polycrystalline silicon thin film transistor.

Features of various embodiments of the present disclosure may be partially or entirely coupled to or combined with each other. They may be linked and operated technically in various ways as those skilled in the art may sufficiently understand. The aspects may be carried out independently of or in association with each other in various combinations.

Hereinafter, a display device according to various example embodiments of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings.

FIG. 1 is a view showing a display device according to an embodiment of the present disclosure. The display device may be an organic light emitting diode (OLED) display device.

In FIG. 1, a display device 110 according to an embodiment of the present disclosure includes a timing controlling unit 120 (e.g., a circuit), a data driving unit 125 (e.g., a circuit), first and second gate driving units 130 and 135 (e.g., circuits), and a display panel 140.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 125, and the gate control signal is transmitted to the first and second gate driving units 130 and 135.

The data driving unit 125 generates a data signal (a data voltage) Vdata (of FIGS. 4 and 5) using the data control signal and the image data transmitted from the timing controlling unit 120 and transmits the data signal to a data line DL of the display panel 140.

The first and second gate driving units 130 and 135 generate a gate signal (a gate voltage) Sc (of FIG. 4), Sc1, Sc2, Em1 and Em2 (of FIG. 5) using the gate control signal transmitted from the timing controlling unit 120 and applies the gate signal Sc, Sc1, Sc2, Em1 and Em2 to a gate line GL of the display panel 140.

The first and second gate driving units 130 and 135 may have a gate in panel (GIP) type to be formed in a non-display area NDA of a substrate of the display panel 140 having the gate line GL, the data line DL and a pixel P.

Although the first and second gate driving units 130 and 135 are disposed in both side portions of the display panel 140 in the embodiment of FIG. 1, one gate driving unit may be disposed in one side portion of the display panel 140 in another embodiment.

The display panel 140 includes a display area DA at a central portion thereof and a non-display area NDA surrounding the display area DA. The display panel 140 displays an image using the gate signal Sc, Sc1, Sc2, Em1 and Em2 and the data signal Vdata. For displaying an image, the display panel 140 includes a plurality of pixels P, a plurality of gate lines GL and a plurality of data lines DL in the display area DA.

Each of the plurality of pixels P includes first to fourth subpixels SP1 to SP4, and the gate line GL and the data line DL cross each other to define the first to fourth subpixels SP1 to SP4. Each of the first to fourth subpixels SP1 to SP4 is connected to the gate line GL and the data line DL. For example, the first to fourth subpixels SP1 to SP4 may correspond to red, green, blue and white colors, respectively.

Figure 4:
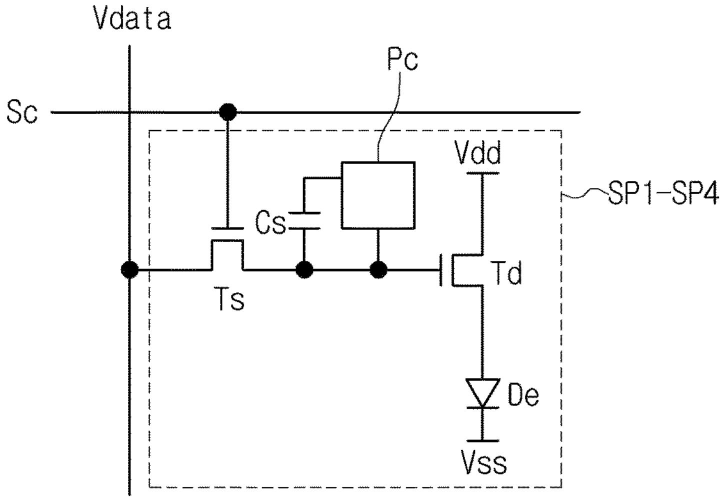
FIG. 4 is a circuit diagram showing a subpixel of a display device according to an embodiment of the present disclosure.

When the display device 110 is an OLED display device, each of the first to fourth subpixels SP1 to SP4 may include a plurality of transistors such as a switching transistor Ts (of FIG. 4), a driving transistor Td (of FIG. 4) and a sensing transistor, a storage capacitor Cs (of FIG. 4) and a light emitting diode De (of FIG. 4).

A structure of the display panel 140 and the subpixel SP of the display device 110 will be illustrated with reference to a drawing.

Figure 2:
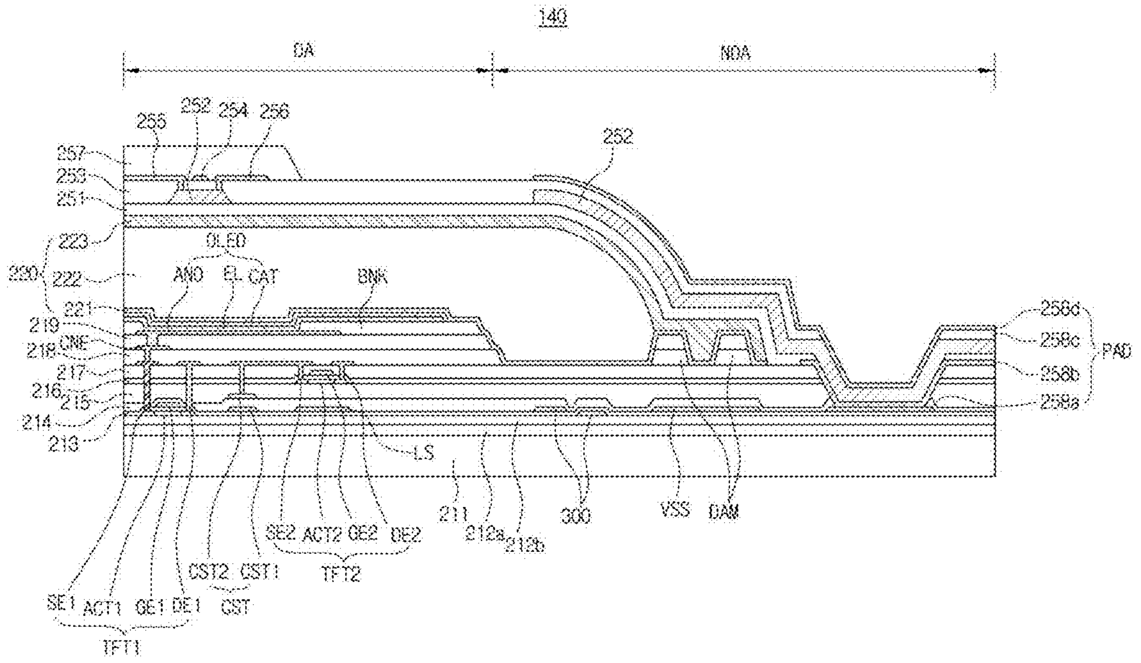
FIG. 2 is a cross-sectional view showing a display panel of a display device according to an embodiment of the present disclosure.
Figure 3:
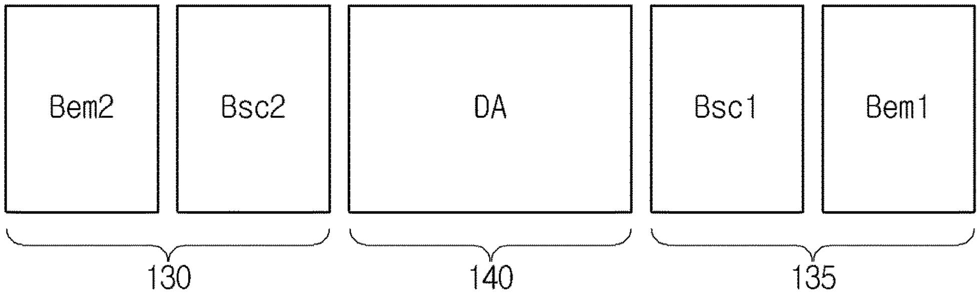
FIG. 3 is a block diagram showing first and second gate driving units and a display panel of a display device according to an embodiment of the present disclosure.
Figure 5:
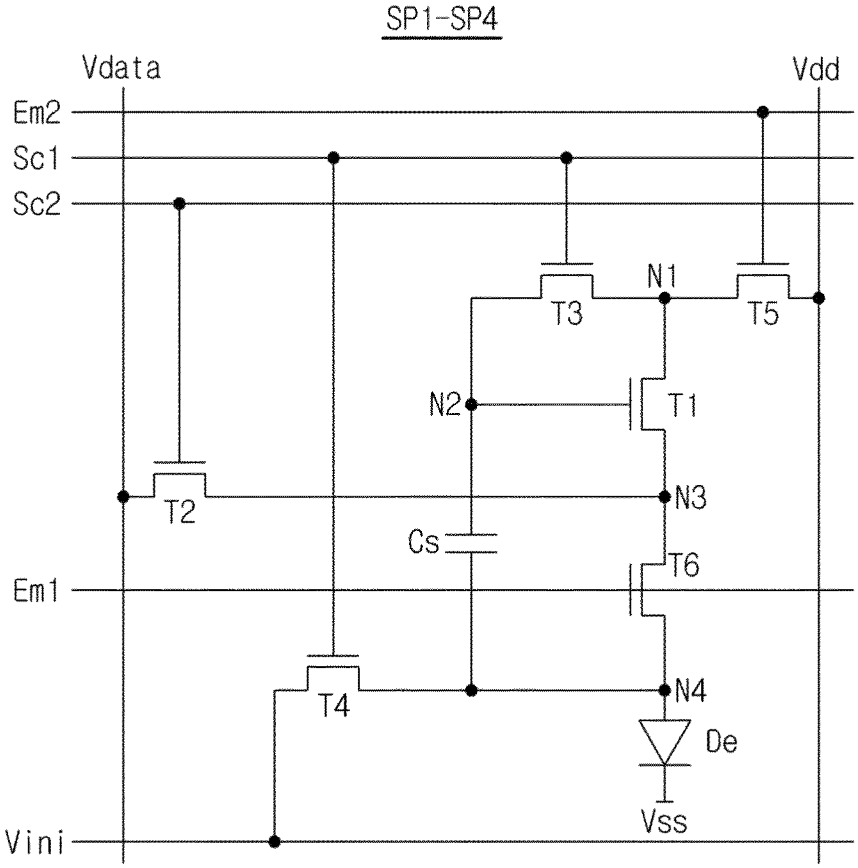
FIG. 5 is a circuit diagram showing a subpixel of a display device according to an embodiment of the present disclosure.

FIG. 2 is a cross-sectional view showing a display panel of a display device according to an embodiment of the present disclosure, FIG. 3 is a block diagram showing first and second gate driving units and a display panel of a display device according to an embodiment of the present disclosure, FIG. 4 is a circuit diagram showing a subpixel of a display device according to an embodiment of the present disclosure, and FIG. 5 is a circuit diagram showing a subpixel of a display device according to an embodiment of the present disclosure.

In FIG. 2, the display panel 140 of the display device 110 according to an embodiment of the present disclosure includes first and second thin film transistors TFT1 and TFT2 and a storage capacitor CST. The first and second thin film transistors TFT1 and TFT2 may include a polycrystalline semiconductor material or an oxide semiconductor material. For example, the first thin film transistor TFT1 may include a polycrystalline semiconductor material, and the second thin film transistor TFT2 may include an oxide semiconductor material.

The first thin film transistor TFT1 is connected to a light emitting diode OLED, and the second thin film transistor TFT2 is connected to the storage capacitor CST.

One subpixel SP includes the light emitting diode OLED and a pixel circuit supplying a driving current to the light emitting diode OLED. The pixel circuit is disposed on a substrate 211, and the light emitting diode OLED is disposed in the pixel circuit. An encapsulating layer 220 is disposed on the light emitting diode OLED to protect the light emitting diode OLED.

The pixel circuit may include a driving thin film transistor, a switching thin film transistor and a storage capacitor. The light emitting diode OLED may include an anode, a cathode and an emitting layer between the anode and the cathode.

The driving thin film transistor and at least one switching thin film transistor use an oxide semiconductor material as an active layer. The thin film transistor using the oxide semiconductor material as an active layer has an excellent blocking effect for a leakage current and has a lower fabrication cost as compared with a thin film transistor using a polycrystalline semiconductor material as an active layer. As a result, to reduce a power consumption and a fabrication cost, the pixel circuit may include the driving thin film transistor and the at least one switching thin film transistor using the oxide semiconductor material.

For example, all of thin film transistors of the pixel circuit may be formed of the oxide semiconductor material, or a portion of the switching thin film transistors may be formed of the oxide semiconductor material.

The thin film transistor using the oxide semiconductor material has a relatively low reliability, while the thin film transistor using the polycrystalline semiconductor material has a relatively rapid operation speed and a relatively high reliability. As a result, the pixel circuit in an embodiment may include both of a switching thin film transistor using the oxide semiconductor material and a switching thin film transistor using the polycrystalline semiconductor material.

The substrate 211 may have a multiple layer of an organic layer and an inorganic layer alternately laminated. For example, the substrate 211 may include an organic layer of an organic insulating material such as polyimide and an inorganic layer of an inorganic insulating material such as silicon oxide ($SiO_2$) alternately laminated.

A lower buffer layer 212*a* is disposed on the substrate 211. The lower buffer layer 212*a* may block a moisture penetrable from an exterior and may have a multiple layer including silicon oxide ($SiO_2$). An auxiliary buffer layer 212*b* for protecting elements from a moisture is disposed on the lower buffer layer 212*a*.

The first thin film transistor TFT1 is disposed on the substrate 211. The first thin film transistor TFT1 may use a polycrystalline semiconductor material as an active layer. The first thin film transistor TFT1 includes a first active layer ACT1 having a channel where an electron or a hole moves, a first gate electrode GE1, a first source electrode SE1 and a first drain electrode DE1.

The first active layer ACT1 includes a first channel region, a first source region at one side of the first channel region and a first drain region at the other side of the first channel region.

The first source region and the first drain region include an intrinsic polycrystalline semiconductor material doped with an impurity of III or V group such as boron (B) or phosphorous (P). The first channel region includes an intrinsic polycrystalline semiconductor material to provide a path where an electron or a hole moves.

The first thin film transistor TFT1 includes a first gate electrode GE1 overlapping the first channel region of the first active layer ACT1. A first gate insulating layer 213 is disposed between the first gate electrode GE1 and the first active layer ACT1. The first gate insulating layer 213 may have a single layer or a multiple layer of an inorganic insulating material such as silicon oxide ($SiO_2$) and silicon nitride (SiNx).

The first thin film transistor TFT1 has a top gate structure where the first gate electrode GE1 is disposed on the first active layer ACT1. As a result, a first capacitor electrode CST1 of the storage capacitor CST and a light shielding layer LS of the second thin film transistor TFT2 may have the same material as the first gate electrode GE1. A fabrication process may be simplified by forming the first gate electrode GE1, the first capacitor electrode CST1 and the light shielding layer LS through one mask process.

The first gate electrode GE1 may include a metallic material. For example, the first gate electrode GE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

A first interlayer insulating layer 214 is disposed on the first gate electrode GE1. For example, the first interlayer insulating layer 214 may include an inorganic insulating material such as silicon oxide ($SiO_2$) and silicon nitride (SiNx).

The display panel 140 may further include an upper buffer layer 215, a second gate insulating layer 216, and a second interlayer insulating layer 217 sequentially disposed on the first interlayer insulating layer 214. The first thin film transistor TFT1 may include a first source electrode SE1 and a first drain electrode DE1 on the second interlayer insulating layer 217, and the first source electrode SE1 and the first drain electrode DE1 may be connected to the first source region and the first drain region, respectively.

For example, the first source electrode SE1 and the first drain electrode DE1 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The upper buffer layer 215 separates a second active layer ACT2 of an oxide semiconductor material of the second thin film transistor TFT2 from the first active layer ACT1 of a polycrystalline semiconductor material and provides a base for the second active layer ACT2.

The second gate insulating layer 216 covers the second active layer ACT2 of the second thin film transistor TFT2. Since the second gate insulating layer 216 is disposed on the second active layer ACT2 of an oxide semiconductor material, the second gate insulating layer 216 includes an inorganic insulating material. For example, the second gate insulating layer 216 may include silicon oxide ($SiO_2$) and silicon nitride (SiNx).

A second gate electrode GE2 includes a metallic material. For example, the second gate electrode GE2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The second thin film transistor TFT2 is disposed on the upper buffer layer 215 and includes the second active layer ACT2 of an oxide semiconductor material, the second gate electrode GE2 on the second gate insulating layer 216, and a second source electrode SE2 and a second drain electrode DE2 on the second interlayer insulating layer 217.

The second active layer ACT2 includes a second channel region, a second source region and a second drain region. The second channel region includes an intrinsic oxide semiconductor material which is not doped with an impurity, and the second source electrode and the second drain electrode are doped with an impurity to be conductorized.

The second thin film transistor TFT2 is disposed above the upper buffer layer 215 and further includes a light shielding layer LS overlapping the second active layer ACT2. The light shielding layer LS blocks a light incident to the second active layer ACT2 to obtain a reliability of the second thin film transistor TFT2. The light shielding layer LS may include the same material as the first gate electrode GE1 and may be disposed on a top surface of the first gate insulating layer 213. The light shielding layer LS may be electrically connected to the second gate electrode GE2 to constitute a double gate structure.

A fabrication process may be simplified by forming the second source electrode SE2 and the second drain electrode DE2 on the second interlayer insulating layer 217 simultaneously with the first source electrode SE1 and the first drain electrode DE1 through one mask process.

A second capacitor electrode CST2 is disposed on the first interlayer insulating layer 214. The second capacitor electrode CST2 overlaps the first capacitor electrode CST1 to constitute a storage capacitor CST. For example, the second capacitor electrode CST2 may have a single layer or a multiple layer of one of molybdenum (Mo), aluminum (Al), chromium (Cr), gold (Au), titanium (Ti), nickel (Ni), neodymium (Nd), copper (Cu) and an alloy thereof.

The storage capacitor CST stores the data signal supplied through the data line DL and supplies the data signal to the light emitting diode OLED. The storage capacitor CST includes two electrodes corresponding to each other and a dielectric layer between the two electrodes. A first interlayer insulating layer 214 is disposed between the first capacitor electrode CST1 and the second capacitor electrode CST2.

One of the first and second capacitor electrodes CST1 and CST2 of the storage capacitor CST may be electrically connected to one of the second source electrode SE2 and the second drain electrode DE2 of the second thin film transistor TFT2. In another embodiment, a connection of the storage capacitor CST may be changed according to the pixel circuit.

A first planarizing layer 218 and a second planarizing layer 219 are sequentially disposed on the pixel circuit for planarizing the pixel circuit. For example, the first planarizing layer 218 and the second planarizing layer 219 may include an organic insulating material such as polyimide and acrylic resin.

A light emitting diode OLED is disposed on the second planarizing layer 219.

The light emitting diode OLED includes an anode ANO, a cathode CAT and an emitting layer EL between the anode ANO and the cathode CAT. When the pixel circuit uses a low-level voltage Vss (of FIG. 4) connected to the cathode CAT commonly, the anode ANO may be disposed in each subpixel as an individual electrode. When the pixel circuit uses a high-level voltage connected to the anode ANO commonly, the cathode CAT may be disposed in each subpixel as an individual electrode.

The light emitting diode OLED is electrically connected to a driving element through a central electrode CNE on the first planarizing layer 218. The anode ANO of the light emitting diode OLED and the first source electrode SE1 of the first thin film transistor TFT1 of the pixel circuit are connected to each other through the central electrode CNE.

The anode ANO is connected to the central electrode CNE through a contact hole in the second planarizing layer 219. The central electrode CNE is connected to the first source electrode SE1 through a contact hole in the first planarizing layer 218.

The central electrode CNE connects the first source electrode SE1 and the anode ANO. For example, the central electrode CNE may include a conductive material such as copper (Cu), silver (Ag), molybdenum (Mo) and titanium (Ti).

The anode ANO may have a multiple layer including a transparent conductive layer and an opaque conductive layer having an excellent reflectance. For example, the transparent conductive layer may include a material having a relatively high work function such as indium tin oxide (ITO) and indium zinc oxide (IZO). The opaque conductive layer may have a single layer or a multiple layer of one of aluminum (Al), silver (Ag), copper (Cu), lead (Pb), molybdenum (Mo), titanium (Ti) and an alloy thereof. The anode ANO may have a structure such that a transparent conductive layer, an opaque conductive layer and a transparent conductive layer are sequentially laminated or a structure such that a transparent conductive layer and an opaque conductive layer are sequentially laminated.

The emitting layer EL includes a hole relating layer, an organic emitting layer and an electron relating layer sequentially or reversely laminated.

A bank layer BNK may be referred to as a pixel defining layer exposing the anode ANO of each subpixel SP1 to SP4. The bank layer BNK may include an opaque material (e.g., a black material) to prevent or at least reduce a light interference between the adjacent subpixels SP1 to SP4. The bank layer BNK may include a shielding material of at least one of a color pigment, an organic black and a carbon. A spacer may be disposed on the bank layer BNK.

The cathode CAT is disposed on a top surface and a side surface of the emitting layer EL to oppose the anode ANO. The cathode CAT may be disposed in the entire display area DA as one body. In a top emission type display device, the cathode CAT may include a transparent conductive material such as indium tin oxide (ITO) and indium zinc oxide (IZO).

An encapsulating layer 220 prevents or at least reduces permeation of a moisture may be disposed on the cathode CAT.

The encapsulating layer 220 may block permeation of a moisture or an oxygen of an exterior into the emitting layer EL. The encapsulating layer 220 may include at least one inorganic encapsulating layer and at least one organic encapsulating layer. The encapsulating layer 220 may exemplarily include a first encapsulating layer 221, a second encapsulating layer 222 and a third encapsulating layer 223 in the display device 110.

The first encapsulating layer 221 is disposed on the substrate 211 having the cathode CAT. The third encapsulating layer 223 is disposed on the substrate 211 having the second encapsulating layer 222 and wraps a top surface, a bottom surface and a side surface of the second encapsulating layer 222 with the first encapsulating layer 221. The first encapsulating layer 221 and the third encapsulating layer 223 may reduce or prevent permeation of a moisture or an oxygen of an exterior into the emitting layer EL. For example, the first encapsulating layer 221 and the third encapsulating layer 223 may include an inorganic insulating material applicable to a low temperature deposition such as silicon nitride (SiNx), silicon oxide (SiOx), silicon oxynitride (SiON) and aluminum oxide ($Al_2O_3$). Deterioration of the emitting layer EL vulnerable to a relatively high temperature may be prevented by depositing the first encapsulating layer 221 and the third encapsulating layer 223 under a relatively low temperature.

The second encapsulating layer 222 may alleviate a stress between the layers of the display device 110 due to bending and may planarize a step difference of the layers of the display device 110. For example, the second encapsulating layer 222 may be disposed on the substrate 211 having the first encapsulating layer 221 and may include a non-photosensitive organic insulating material such as acrylic resin, epoxy resin, phenolic resin, polyamide resin, polyimide resin, polyethylene and silicon oxycarbide (SiOC) or a photosensitive organic insulating material such as photoacryl. When the second encapsulating layer 222 is formed through an inkjet method, a dam DAM may be disposed to prevent or at least reduce diffusion of the liquid material for the second encapsulating layer 222 to an edge portion of the substrate 211. The dam DAM may be disposed closer to the edge portion of the substrate 211 than the second encapsulating layer 222. The dam DAM prevents the second encapsulating layer 222 from being diffused to a pad area of an outermost edge portion of the substrate 211 where a conductive pad is disposed.

Although the dam DAM is disposed to prevent diffusion of the second encapsulating layer 222, a moisture may permeate the emitting layer through the exposed second encapsulating layer 222 when the second encapsulating layer 222 is formed higher than the dam DAM. As a result, the dam DAM may be formed to have a number of at least ten.

The dam DAM may be disposed on the second interlayer insulating layer 217 in the non-display area NDA.

The dam DAM may be formed simultaneously with the first planarizing layer 218 and the second planarizing layer 219. For example, a lower layer of the dam DAM may be formed simultaneously with the first planarizing layer 218 and an upper layer of the dam DAM may be formed simultaneously with the second planarizing layer 219 such that the dam DAM has a double layered structure.

As a result, the dam DAM may have the same material as the first planarizing layer 218 and the second planarizing layer 219.

The dam DAM may be disposed to overlap a low-level voltage line VSS. For example, the low-level voltage line VSS may be disposed under the dam DAM in the non-display area NDA.

The low-level voltage line VSS and the first and second gate driving units 130 and 135 having a gate-in-panel (GIP) type are disposed to surround the display area DA of the display panel 140, and the low-level voltage line VSS may be disposed outside the first and second gate driving units 130 and 135. Further, the low-level voltage line VSS may be connected to the cathode CAT to supply a common voltage. Although the first and second gate driving units 130 and 135 are shown to have a simple structure in FIG. 1, the first and second gate driving units 130 and 135 may include thin film transistors having the same structure as the thin film transistor of the display area DA.

For example, the low-level voltage line VSS may have the same material as the first gate electrode GE1 or the same material as the second capacitor electrode CST2, the first source electrode SE1 and the first drain electrode DE1.

The low-level voltage line VSS may supply a low-level voltage Vss (of FIG. 4) to the subpixel SP1 to SP4 in the display area DA.

A touch layer may be disposed on the encapsulating layer 220. A touch buffer layer 251 of the touch layer may be disposed between a touch sensor metal and the cathode CAT of the light emitting diode OLED, and the touch sensor metal may include a touch connecting line 252 and 254 and a touch electrode 255 and 256.

The touch buffer layer 251 may block permeation of a solution (a developing solution or an etching solution) used in a fabrication process of the touch sensor metal on the touch buffer layer 251 or a moisture of an exterior into the emitting layer EL including an organic material. As a result, the touch buffer layer 251 may prevent deterioration of the emitting layer EL susceptible to a solution or a moisture.

The touch buffer layer 251 includes an organic insulating material applicable to a low temperature lower than about 100° C. and having a dielectric constant of about 1 to about 3 to prevent or at least reduce deterioration of the emitting layer EL including an organic material vulnerable to a relatively high temperature. For example, the touch buffer layer 251 may include a material of an acrylic group, an epoxy group or a siloxane group. The touch buffer layer 251 of an organic insulating material having a planarization property may prevent deterioration of the encapsulating layer 220 due to a bending of the display device 110 and a breakdown of the touch sensor metal on the touch buffer layer 251.

In a touch sensor structure based on a mutual capacitance, the touch electrodes 255 and 256 may be disposed on the touch buffer layer 251 and may alternate each other.

The touch connecting line 252 and 254 may connect the touch electrodes 255 and 256. The touch connecting line 252 and 254 and the touch electrodes 255 and 256 may be disposed in different layers, and a touch insulating layer 253 may be disposed between the touch connecting line 252 and 254 and the touch electrodes 255 and 256.

The touch connecting line 252 and 254 may be disposed to overlap the bank layer BNK to prevent reduction of an aperture ratio.

The touch electrodes 255 and 256 may be electrically connected to a touch driving circuit (not shown) through a portion of the touch connecting line 252 connected to a touch pad PAD passing through a top surface and a side surface of the encapsulating layer 220 and a top surface and a side surface of the dam DAM.

The portion of the touch connecting line 252 may receive a touch driving signal from the touch driving circuit and may transmit the touch driving signal to the touch electrode 255 and 256. The portion of the touch connecting line 252 may transmit a touch sensing signal of the touch electrodes 255 and 256 to the touch driving circuit.

A touch protecting layer 257 may be disposed on the touch electrodes 255 and 256. Although the touch protecting layer 257 is disposed on the touch electrodes 255 and 256 in an embodiment of FIG. 2, the touch protecting layer 257 may extend to a front or a rear of the dam DAM to be disposed on the touch connecting line 252.

A color filter (not shown) may be disposed on the encapsulating layer 220. The color filter may be disposed on the touch layer or may be disposed between the encapsulating layer 220 and the touch layer.

In FIG. 3, the first gate driving unit 130 of the display device 110 includes a second scan block Bsc2 and a second emission block Bem2, and the second gate driving unit 135 of the display device 110 includes a first scan block Bsc1 and a first emission block Bem1. The display area DA of the display panel 140 is disposed between the first and second gate driving units 130 and 135.

In another embodiment, the disposition structure of the first scan block Bsc1, the second scan block Bsc2, the first emission block Bem1 and the second emission block Bem2 in the first and second gate driving units 130 and 135 may be variously changed.

For example, the second emission block Bem2 is disposed farther from the display panel 140 than the second scan block Bsc2 and the first emission block Bem1 is disposed farther from the display panel 140 than the first scan block Bsc1 in an embodiment of FIG. 3. In another embodiment, the second scan block Bsc2 may be disposed farther from the display panel 140 than the second emission block Bem2 or the first scan block Bsc1 may be disposed farther from the display panel 140 than the first emission block Bem1.

Each of the second scan block Bsc2 and the second emission block Bem2 of the first gate driving unit 130 and the first scan block Bsc1 and the first emission block Bem1 of the second gate driving unit 135 may be one stage of a shift register, and the shift register may include a plurality of stages connected to each other in a cascade type.

In the first gate driving unit 130, the second scan block Bsc2 and the second emission block Bem2 generate a second scan signal Sc2 (of FIG. 5) and a second emission signal Em2 (of FIG. 5), respectively.

In the second gate driving unit 135, the first scan block Bsc1 and the first emission block Bem1 generate a first scan signal Sc1 (of FIG. 5) and a first emission signal Em1 (of FIG. 5), respectively.

The first scan signal Sc1 of the first scan block Bsc1 is supplied to third and fourth transistors T3 and T4 (of FIG. 5) in each subpixel SP1 to SP4 of the display area DA through the gate line GL. The second scan signal Sc2 of the second scan block Bsc2 is supplied to a second transistor T2 (of FIG. 5) in each subpixel SP1 to SP4 of the display area DA through the gate line GL.

The first emission signal Em1 of the first emission block Bem1 is supplied to a sixth transistor T6 (of FIG. 5) in each subpixel SP1 to SP4 of the display area DA through the gate line GL, and the second emission signal Em2 of the second emission block Bem2 is supplied to a fifth transistor T5 (of FIG. 5) in each subpixel SP1 to SP4 of the display area DA through the gate line GL.

In another embodiment, the first and second gate driving units 130 and 135 may have a symmetric structure. For example, each of the first and second gate driving units 130 and 135 may include the first scan block Bsc1, the second scan block Bsc2, the first emission block Bem1 and the second emission block Bem2.

In FIG. 4, each of the first, second, third and fourth subpixels SP1, SP2, SP3 and SP4 of the display panel 140 of the display device 110 according to an embodiment of the present disclosure includes a switching transistor Ts, a driving transistor Td, a compensation part Pc, a storage capacitor Cs, and a light emitting diode De. Active layers of the switching transistor Ts and the driving transistor Td may be formed of a semiconductor material, such as an oxide semiconductor material, amorphous semiconductor material, polycrystalline semiconductor material, or organic semiconductor material.

The oxide semiconductor material may have an excellent effect of preventing or at least reducing a leakage current and relatively inexpensive manufacturing cost. The oxide semiconductor may be formed of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor can include zinc oxide (ZnO), zinc tin oxide (ZTO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO).

The polycrystalline semiconductor material has a fast movement speed of carriers such as electrons and holes and thus has high mobility, and has low energy power consumption and superior reliability. The polycrystalline semiconductor may be formed of polycrystalline silicon (poly-Si).

The amorphous semiconductor material may be formed of amorphous silicon (a-Si).

For example, the switching transistor Ts and the driving transistor Td may be an oxide semiconductor thin film transistor, amorphous silicon thin film transistor or a low temperature polycrystalline silicon thin film transistor.

The switching transistor Ts is switched according to the scan signal Sc as the gate signal. A gate electrode of the switching transistor Ts is connected to the scan signal Sc, a source electrode of the switching transistor Ts is connected to a first capacitor electrode of the storage capacitor Cs and the compensation part Pc, and a drain electrode of the switching transistor Ts is connected to the data signal Vdata.

The driving transistor Td is switched according to a voltage of the first capacitor electrode of the storage capacitor Cs. A gate electrode of the driving transistor Td is connected to the first capacitor electrode of the storage capacitor Cs and the compensation part Pc, a source electrode of the driving transistor Td is connected to an anode of the light emitting diode De, and a drain electrode of the driving transistor Td is connected to the high-level voltage Vdd.

The compensation part Pc is connected among the switching transistor Ts, the driving transistor Td and the storage capacitor Cs and compensates a variation of the threshold voltage Vth of the driving transistor Td.

The storage capacitor Cs stores the data signal Vdata. A first capacitor electrode of the storage capacitor Cs is connected to the source electrode of the switching transistor Ts and the compensation part Pc, and a second capacitor electrode of the storage capacitor Cs is connected to the compensation part Pc.

The light emitting diode De is connected between the driving transistor Td and the low-level voltage Vss and emits a light of a luminance proportional to a current of the driving transistor Td. An anode of the light emitting diode De is connected to the source electrode of the driving transistor Td, and a cathode of the light emitting diode De is connected to the low-level voltage Vss.

The data signal Vdata is supplied from the data driving unit 125 to each subpixel SP1 to SP4 of the display panel 140, and the scan signal Sc is supplied from the first and second gate driving units 130 and 135 to each subpixel SP1 to SP4 of the display panel 140.

In the pixel circuit of the present disclosure, various configurations of internal compensation circuits are possible. For example, a number of transistors TFTs in the pixel circuit of the present disclosure may be three or more, and a number of capacitors may be one or more. For example, each of the first to fourth subpixels SP1 to SP4 may have one of a 3T1C structure including three transistors (3T) and one capacitor (1C), a 6TIC structure including six transistors and one capacitor, a 7T1C structure including seven transistors and one capacitor and an 8T1C structure including eight transistors and one capacitor.

In FIG. 5, each of the first to fourth subpixels SP1 to SP4 of the display panel 140 of the display device 110 according to an embodiment of the present disclosure includes first to sixth transistors T1 to T6, a storage capacitor Cs and a light emitting diode De. At least one of the first to sixth transistors T1 to T6 may be an oxide semiconductor thin film transistor, and the others of the first to sixth transistors T1 to T6 may be a low temperature polycrystalline silicon thin film transistor.

For example, the first, second, fifth and sixth transistors T1, T2, T5 and T6 may be a negative (N) type low temperature polycrystalline silicon thin film transistor, and the third and fourth transistors T3 and T4 may be a negative (N) type oxide semiconductor thin film transistor.

The first transistor T1 as a driving transistor is switched according to a voltage of the first capacitor electrode of the storage capacitor Cs. A gate electrode of the first transistor T1 is connected to a second node N2, a source electrode of the first transistor T1 is connected to a third node N3, and a drain electrode of the first transistor T1 is connected to a first node N1.

The second transistor T2 as a switching transistor is switched according to a second scan signal Sc2. A gate electrode of the second transistor T2 is connected to the second scan signal Sc2, a source electrode of the second transistor T2 is connected to a third node N3, and a drain electrode of the second transistor T2 is connected to the data signal Vdata.

The third transistor T3 as a sensing transistor is switched according to a first scan signal Sc1. A gate electrode of the third transistor T3 is connected to the first scan signal Sc1, a source electrode of the third transistor T3 is connected to the first node N1, and a drain electrode of the third transistor T3 is connected to the second node N2.

The fourth transistor T4 is switched according to a first scan signal Sc1. A gate electrode of the fourth transistor T4 is connected to the first scan signal Sc1, a drain electrode of the fourth transistor T4 is connected to an initial signal (initial voltage) Vini, and a source electrode of the fourth transistor T4 is connected to a fourth node N4.

The fifth transistor T5 as an emitting transistor is switched according to a second emission signal Em2. A gate electrode of the fifth transistor T5 is connected to the second emission signal Em2, a source electrode of the fifth transistor T5 is connected to the first node N1, and a drain electrode of the fifth transistor T5 is connected to a high-level signal (high level voltage) Vdd.

The sixth transistor T6 as an emitting transistor is switched according to a first emission signal Em1. A gate electrode of the sixth transistor T6 is connected to the first emission signal Em1, a source electrode of the sixth transistor T6 is connected to the fourth node N4, and a drain electrode of the sixth transistor T6 is connected to the third node N3.

The storage capacitor Cs stores the data signal Vdata and the threshold voltage Vth. A first capacitor electrode of the storage capacitor Cs is connected to the second node N2, and a second capacitor electrode of the storage capacitor Cs is connected to the fourth node N4.

The light emitting diode De is connected between the fourth and sixth transistors T4 and T6 and the low-level signal Vss to emit a light of a luminance proportional to a current of the first transistor T1. An anode of the light emitting diode De is connected to the fourth node N4, and a cathode of the light emitting diode De is connected to the low-level signal Vss.

The drain electrode of the first transistor T1, the source electrode of the third transistor T3 and the source electrode of the fifth transistor T5 constitute the first node N1, and the gate electrode of the first transistor T1, the drain electrode of the third transistor T3 and the first capacitor electrode of the storage capacitor Cs constitute the second node N2. The source electrode of the first transistor T1, the source electrode of the second transistor T2 and the drain electrode of the sixth transistor T6 constitute the third node N3, and the source electrode of the fourth transistor T4, the source electrode of the sixth transistor T6, the second capacitor electrode of the storage capacitor Cs and the anode of the light emitting diode De constitute the fourth node N4.

In each of the first to fourth subpixels SP1 to SP4, during a period where the first, third, fourth, and fifth transistors T1, T3, T4 and T5 are turned on and the second and sixth transistors T2 and T6 are turned off, the second node N2 may be initialized by the high-level signal Vdd and the fourth node N4 may be initialized by the initial signal Vini. (initialization period)

During a period where the first, second, third and fourth transistors T1, T2, T3 and T4 are turned on and the fifth and sixth transistors T5 and T6 are turned off, a sum (Vdata+Vth) of the data signal Vdata and the threshold voltage Vth may be stored in the storage capacitor Cs and the fourth node N4 may be initialized by the initial signal Vini. (sampling period)

During a period where the first, fifth, and sixth transistors T1, T5, and T6 are turned on and the second, third and fourth transistors T2, T3 and T4 are turned off, the light emitting diode De may emit a light corresponding to the data signal Vdata. (emission period)

In the display device 110, to reduce a number of output terminals of the data driving unit 125 and a number of data link lines of the display panel 140, the data signal is transmitted using a plurality of mux transistors.

Figure 6:
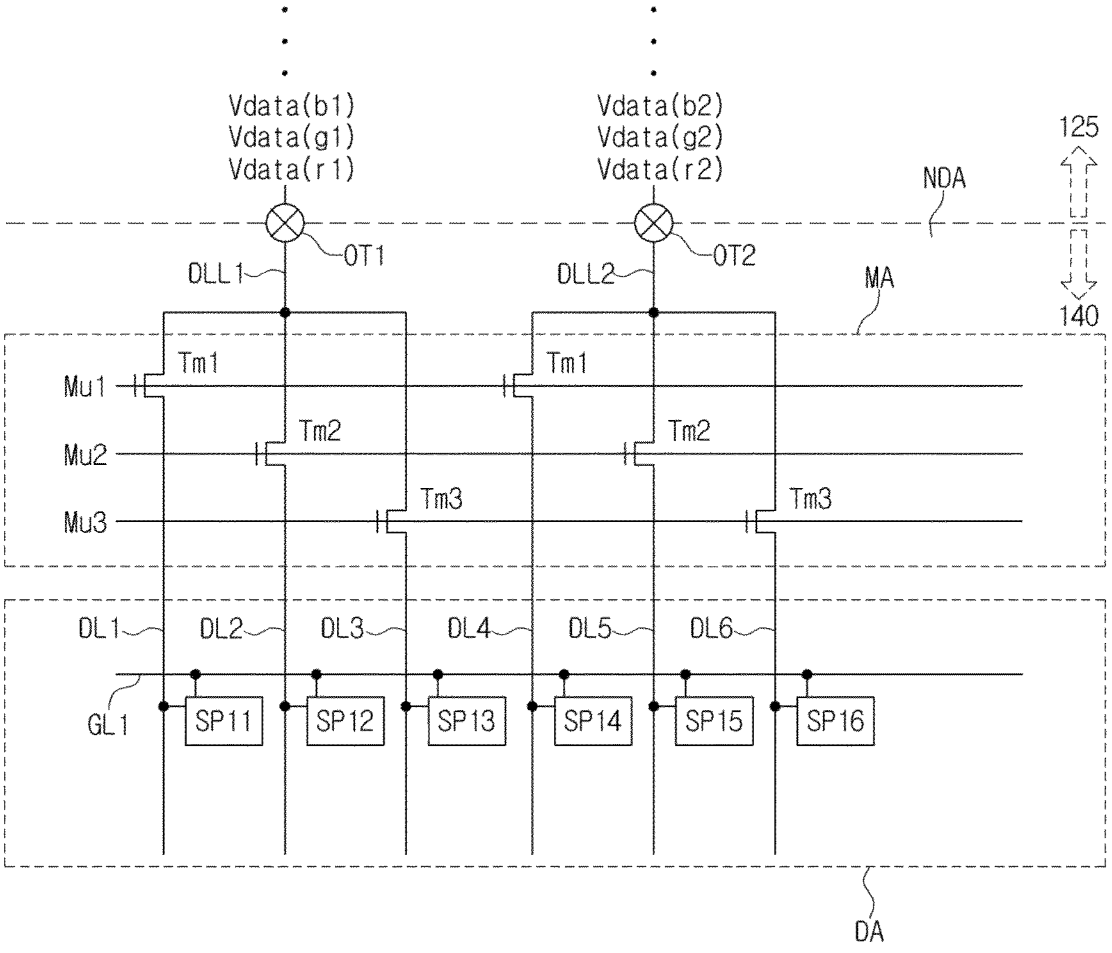
FIG. 6 is a view showing a data driving unit and a display panel of a display device according to an embodiment of the present disclosure.

FIG. 6 is a view showing a data driving unit and a display panel of a display device according to an embodiment of the present disclosure.

In FIG. 6, the data driving unit 125 of the display device 110 according to an embodiment of the present disclosure includes a plurality of output terminals OT1 and OT2 where the data signal Vdata is outputted.

The display panel 140 of the display device 110 is divided into the display area DA and the non-display area NDA at a periphery of the display area DA. A plurality of subpixels SP11 to SP16, a plurality of data lines DL1 to DL6, and a plurality of gate lines GL1 are disposed in the display area DA, and a plurality of data link lines DLL1 and DLL2 and a plurality of mux transistors Tm1, Tm2 and Tm3 are disposed in the non-display area NDA. The plurality of mux transistors Tm1, Tm2 and Tm3 are disposed in a mux area MA of the non-display area NDA.

The first and second data link lines DLL1 and DLL2 may be connected to first and second output terminals OT1 and OT2, respectively, and each of the first and second data link lines DLL1 and DLL2 may be connected to first, second and third mux transistors Tm1, Tm2 and Tm3.

The first, second, and third mux transistors Tm1, Tm2 and Tm3 are switched according to first, second and third test mux signals Mu1, Mu2 and Mu3, respectively. The first mux transistor Tm1 may be connected to each of first and fourth data lines DL1 and DL4. The second mux transistor Tm2 may be connected to each of second and fifth data lines DL2 and DL5. The third mux transistor Tm3 may be connected to each of third and sixth data lines DL3 and DL6.

The first, second, and third mux transistors Tm1, Tm2 and Tm3 may have a negative (N) type. Gate electrodes of the first, second, and third mux transistors Tm1, Tm2 and Tm3 may be connected to the first, second, and third test mux signals Mu1, Mu2 and Mu3, respectively. Drain electrodes of the first, second, and third mux transistors Tm1, Tm2 and Tm3 may be connected to each of the first and second data line lines DLL1 and DLL2. Source electrodes of the first, second, and third mux transistors Tm1, Tm2 and Tm3 may be connected to the first to sixth data lines DL1 to DL6, respectively.

A first-first subpixel SP11 connected to the first data line DL1 and the first gate line GL1 may correspond to a red color, a first-second subpixel SP12 connected to the second data line DL2 and the first gate line GL1 may correspond to a green color, and a first-third subpixel SP13 connected to the third data line DL3 and the first gate line GL1 may correspond to a blue color. A first-fourth subpixel SP14 connected to the fourth data line DL4 and the first gate line GL1 may correspond to a red color, a first-fifth subpixel SP15 connected to the fifth data line DL5 and the first gate line GL1 may correspond to a green color, and a first-sixth subpixel SP16 connected to the sixth data line DL6 and the first gate line GL1 may correspond to a blue color.

When the first mux transistor Tm1 is turned on according to the first test mux signal Mu1 synchronized to a first red data signal Vdata(r1) and a second red data signal Vdata(r2), the first red data signal Vdata(r1) and the second red data signal Vdata(r2) of the first and second data link lines DLL1 and DLL2 may be supplied to the first-first subpixel SP11 and the first-fourth subpixel SP14 through the first data line DL1 and the fourth data line DL4, respectively.

Next, when the second mux transistor Tm2 is turned on according to the second test mux signal Mu2 synchronized to a first green data signal Vdata(g1) and a second green data signal Vdata(g2), the first green data signal Vdata(g1) and the second green data signal Vdata(g2) of the first and second data link lines DLL1 and DLL2 may be supplied to the first-second subpixel SP12 and the first-fifth subpixel SP15 through the second data line DL2 and the fifth data line DL5, respectively.

Next, when the third mux transistor Tm3 is turned on according to the third test mux signal Mu3 synchronized to a first blue data signal Vdata(b1) and a second blue data signal Vdata(b2), the first blue data signal Vdata(b1) and the second blue data signal Vdata(b2) of the first and second data link lines DLL1 and DLL2 may be supplied to the first-third subpixel SP13 and the first-sixth subpixel SP16 through the third data line DL3 and the sixth data line DL6, respectively.

In the display device 110 according to an embodiment of the present disclosure, the plurality of output terminals OT1 and OT2 of the data driving unit 125 are connected to the plurality of mux transistors Tm1, Tm2 and Tm3 through the plurality of data link lines DLL1 and DLL2 of the display panel 140, and the plurality of mux transistors Tm1, Tm2 and Tm3 are connected to the plurality of data lines DL1 to DL6.

The red, green and blue data signals Vdata(r1), Vdata(g1) and Vdata(b1) and Vdata(r2), Vdata(g2) and Vdata(b2) are sequentially outputted from each of the plurality of output terminals OT1 and OT2, and the plurality of mux transistors Tm1, Tm2 and Tm3 transmit the red, green and blue data signals Vdata(r1), Vdata(g1) and Vdata(b1) and Vdata(r2), Vdata(g2) and Vdata(b2) to the plurality of subpixels SP11 to SP16 through the plurality of data lines DL1 to DL6. As a result, a number of the plurality of output terminals OT1 and OT2 of the data driving unit 125 and a number of the plurality of data link lines DLL1 and DLL2 of the display panel 140 may be reduced.

Although the plurality of data lines DL are classified into three kinds and the plurality of mux transistors include the first, second and third mux transistors Tm1, Tm2 and Tm3 connected to the three kinds of the plurality of data lines DL, respectively, in an embodiment of FIG. 6, the plurality of data lines DL may be classified into six kinds and the plurality of mux transistors may include first to sixth mux transistors connected to the six kinds of the plurality of data lines DL in another embodiment.

The display device 110 may be fabricated through a test step of a lighting and an attachment step of the data driving unit.

Figure 7:
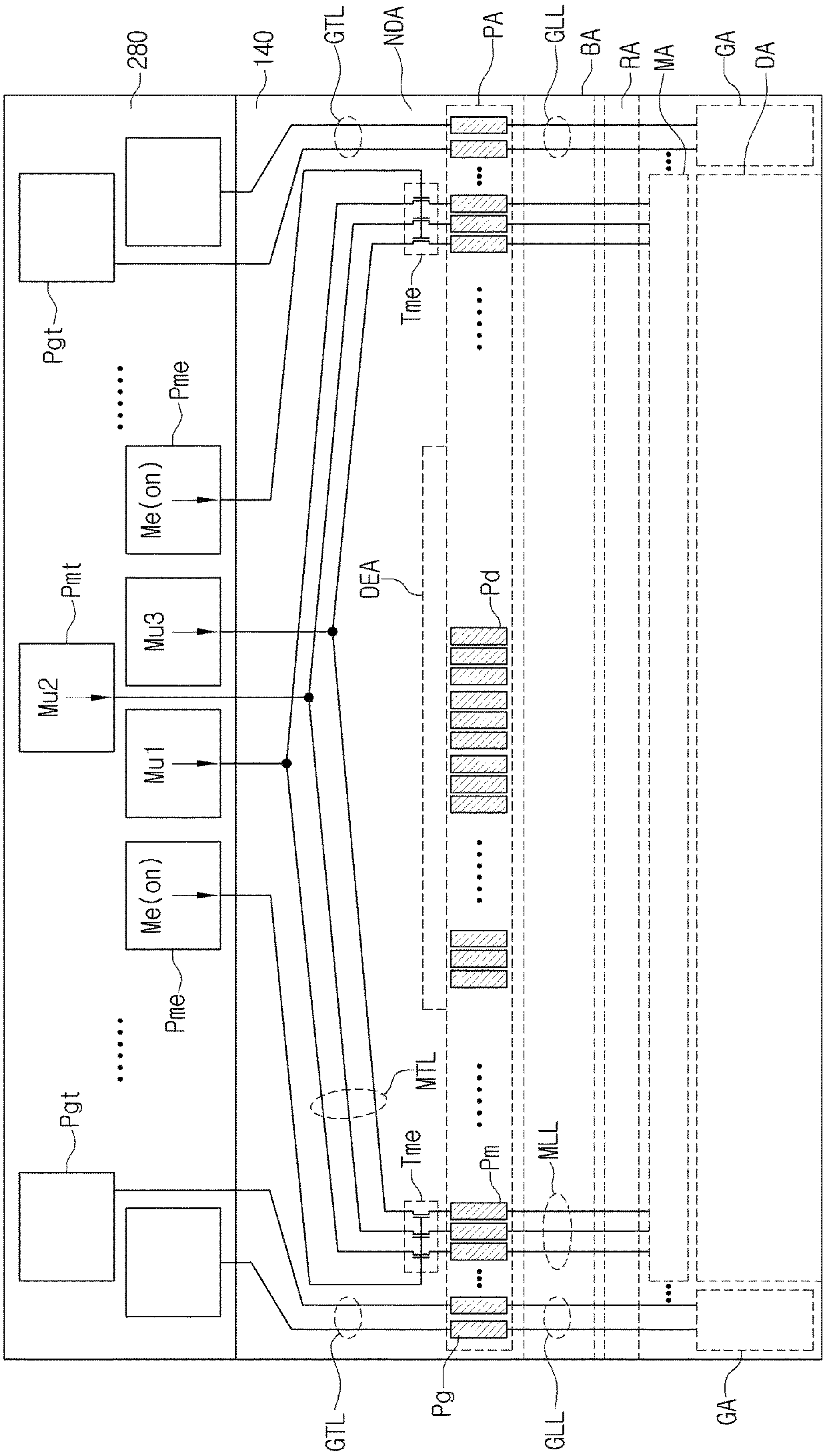
FIG. 7 is a view showing a test step of a lighting of a display device according to an embodiment of the present disclosure.
Figure 8:
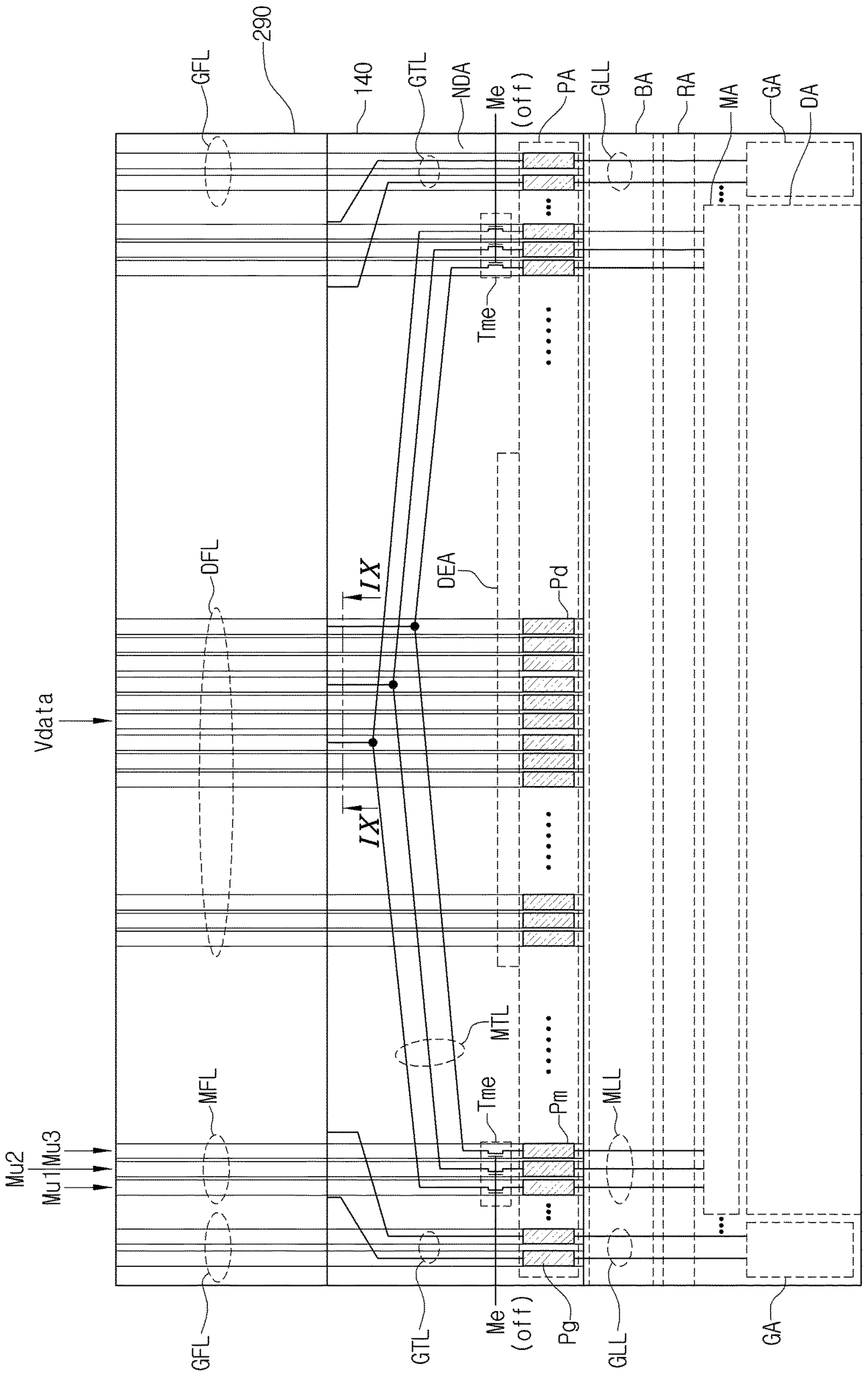
FIG. 8 is a view showing an attachment step of a data driving unit of a display device according to an embodiment of the present disclosure.
Figure 9:
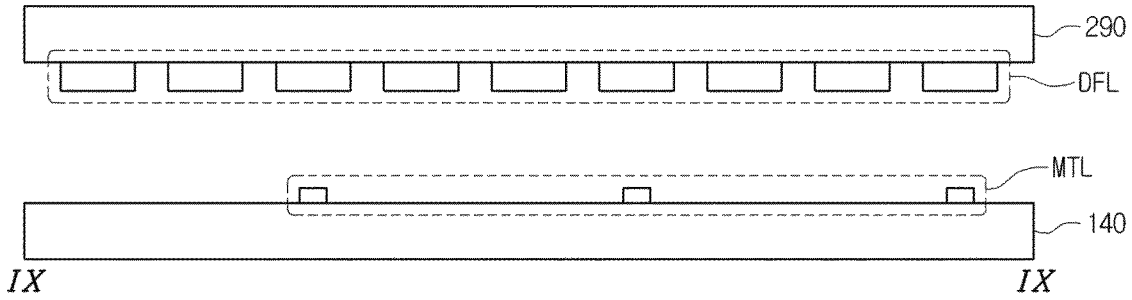
FIG. 9 is a cross-sectional view taken along a line IX-IX of FIG. 8 according to an embodiment of the present disclosure.

FIG. 7 is a view showing a test step of a lighting of a display device according to an embodiment of the present disclosure, FIG. 8 is a view showing an attachment step of a data driving unit of a display device according to an embodiment of the present disclosure, and FIG. 9 is a cross-sectional view taken along a line IX-IX of FIG. 8 according to an embodiment of the present disclosure.

In FIG. 7, a test substrate 280 is disposed adjacent to the display panel 140 and is connected to the display panel 140 in a test step of a lighting of a fabrication process of the display device 110 according to an embodiment of the present disclosure.

The display panel 140 includes the display area DA where the plurality of subpixels SP11 to SP16 are disposed and the non-display area NDA adjacent to the display area DA. The non-display area NDA includes a gate area GA where the first and second gate driving units 130 and 135 are disposed, a mux area MA where the plurality of mux transistors Tm1 to Tm3 are disposed, a routing area RA where a plurality of signal lines are disposed, a bending area BA providing a flexibility to the display panel 140, a pad area PA where a plurality of gate pads Pg, a plurality of mux pads Pm and a plurality of data pads Pd are disposed and a data enable area DEA where a plurality of data enable transistors are disposed.

The test substrate 280 includes a plurality of gate test pads Pgt, a plurality of mux test pads Pmt, a plurality of data test pads (not shown) and a plurality of mux enable pads Pme.

The plurality of gate test pads Pgt may be connected to the plurality of gate test lines GTL, respectively, and the plurality of gate test lines GTL may be connected to the plurality of gate pads Pg, respectively. The plurality of gate pads Pg may be connected to the plurality of blocks Bsc1, Bsc2, Bem1 and Bem2 of the first and second gate driving units 130 and 135, respectively, through the plurality of gate link lines GLL.

In the test step of a lighting, a plurality of test gate control signals including a gate clock may be transmitted from the plurality of gate test pads Pgt to the plurality of blocks Bsc1, Bsc2, Bem1 and Bem2 of the first and second gate driving units 130 and 135.

The plurality of mux test pads Pmt may be connected to the plurality of mux test lines MTL, respectively, and the plurality of mux test lines MTL may be connected to the plurality of mux pads Pm, respectively, through a plurality of mux enable transistors Tme. The plurality of mux pads Pm may be connected to the plurality of mux transistors Tm1 to Tm3, respectively, through a plurality of mux link lines MLL.

Each of the plurality of mux enable transistors Tme may be a negative (N) type. Gate electrodes of the plurality of mux enable transistors Tme may be connected to the plurality of mux enable pads Pme, respectively, to receive a mux enable signal Me. Drain electrodes of the plurality of mux enable transistors Tme may be connected to the plurality of mux test lines MTL, respectively, and source electrodes of the plurality of mux enable transistors Tme may be connected to the plurality of mux pads Pm, respectively.

In the test step of a lighting, the plurality of mux enable transistors Tme may be turned on by the mux enable signal Me of a logic high level (Me(on)), and the test mux signals Mu1, Mu2 and Mu3 may be transmitted from the plurality of mux test pads Pmt to the plurality of mux transistors Tm1, Tm2 and Tm3.

The plurality of data test pads may be connected to the plurality of data test lines (not shown), respectively, and the plurality of data test lines may be connected to the plurality of data pads Pd, respectively, through the plurality of data enable transistors. Each of the plurality of data pads Pd may be connected to the plurality of mux transistors Tm1, Tm2 and Tm3 through the plurality of data link lines DLL1 and DLL2, and the plurality of mux transistors Tm1, Tm2 and Tm3 may be connected to the plurality of data lines DL1 to DL6, respectively.

In the test step of a lighting, the plurality of data enable transistors may be turned on, and the test data signal Vdata may be transmitted from the plurality of data test pads to the plurality of data lines DL1 to DL6.

In the test step of a lighting, the plurality of gate test pads Pgt of the test substrate 280 are connected to the plurality of blocks Bsc1, Bsc2, Bem1 and Bem2 of the first and second gate driving units 130 and 135, respectively, through the plurality of gate test lines GTL, the plurality of gate pads Pg and the plurality of gate link lines GLL of the display panel 140, and the plurality of test gate control signals are transmitted from the plurality of gate test pads Pgt to the plurality of blocks Bsc1, Bsc2, Bem1 and Bem2 of the first and second gate driving units 130 and 135.

The plurality of mux test pads Pmt of the test substrate 280 are connected to the plurality of mux transistors Tm1, Tm2 and Tm3, respectively, through the plurality of mux test lines MTL, the plurality of mux enable transistors Tme turned on, the plurality of mux pads Pm and the plurality of mux link lines MLL of the display panel 140, and the plurality of test mux signals Mu1, Mu2 and Mu3 are transmitted from the plurality of mux test pads Pmt to the plurality of mux transistors Tm1, Tm2 and Tm3, respectively.

The plurality of data test pads of the test substrate 280 are connected to the plurality of mux transistors Tm1, Tm2 and Tm3, respectively, through the plurality of data test lines, the plurality of data enable transistors Tme turned on, the plurality of data pads Pd and the plurality of data link lines DLL1 and DLL2 of the display panel 140, and the plurality of mux transistors Tm1, Tm2 and Tm3 are connected to the plurality of data lines DL1 to DL6, respectively. Further, the plurality of test data signals Vdata are transmitted from the plurality of data test pads Pdt to the plurality of data lines DL1 to DL6, respectively.

As a result, the plurality of test data signals Vdata are supplied to the plurality of subpixels SP11 to SP16 of the display panel 140, and deterioration of the display panel 140 may be judged by detecting whether the plurality of subpixels SP11 to SP16 emit or not.

After the test step of a lighting, the test substrate 280 is detached from the display panel 140.

In FIGS. 8 and 9, an attachment step of the data driving unit 125 is performed to the display panel 140 which is judged as a good product in the test step of a lighting using a connecting unit such as a flexible printed circuit (FPC) 290.

The data driving unit 125 such as an integrated circuit (IC) may be mounted on the FPC 290, and a printed circuit board (PCB) where the timing controlling unit 120 is mounted may be connected to the FPC 290.

The FPC 290 includes a plurality of gate film lines GFL, a plurality of mux film lines MFL and a plurality of data film lines DFL. The plurality of gate film lines GFL may transmit the plurality of gate control signals, the plurality of mux film lines MFL may transmit the plurality of mux signals Mu1, Mu2 and Mu3, and the plurality of data film lines DFL may transmit the plurality of data signals Vdata.

The plurality of gate film lines GFL of the FPC 290 may be connected to the plurality of gate pads Pg, respectively, of the display panel 140. The plurality of mux film lines MFL of the FPC 290 may be connected to the plurality of mux pads Pm, respectively, of the display panel 140. The plurality of data film lines DFL of the FPC 290 may be connected to the plurality of data pads Pd, respectively, of the display panel 140.

In the attachment step of the data driving unit 125, the plurality of gate film lines GFL, the plurality of mux film lines MFL, and the plurality of data film lines DFL of the FPC 290 may be connected to the plurality of gate pads Pg, the plurality of mux pads Pm and the plurality of data pads Pd, respectively, of the display panel 140. The plurality of gate control signals may be transmitted from the plurality of gate film lines GFL to the plurality of blocks Bsc1, Bsc2, Bem1 and Bem2, respectively, of the first and second gate driving units 130 and 135 through the plurality of gate pads Pg. The plurality of mux signals Mu1, Mu2 and Mu3 may be transmitted from the plurality of mux film lines MFL to the plurality of mux transistors Tm1, Tm2 and Tm3, respectively, through the plurality of mux pads Pm. The plurality of data signals Vdata may be transmitted from the plurality of data film lines DFL to the plurality of data lines DL1 to DL6, respectively, through the plurality of data pads Pd.

The plurality of data film lines DFL of the FPC 290 and the plurality of mux test lines MTL of the display panel 140 overlap each other.

Although not shown, a protecting layer may be disposed on the plurality of mux test lines MTL.

As a result, when a mux signal blocking unit such as the plurality of mux enable transistors Tme are not disposed, the plurality of mux signals Mu1, Mu2 and Mu3 of the plurality of mux film lines MFL may be transmitted to the plurality of mux test lines MTL through the plurality of mux pads Pm. Since the data signal Vdata of the plurality of data film lines DFL is distorted due to a coupling between the plurality of mux signals Mu1, Mu2 and Mu3 of the plurality of mux test lines MTL and the data signal Vdata of the plurality of data film lines DFL, deterioration such as a line defect may occur in the display panel 140.

In the display device 110 according to an embodiment of the present disclosure, the plurality of mux enable transistors Tme are disposed between the plurality of mux test lines MTL and the plurality of mux pads Pm, and the plurality of mux enable transistors Tme are turned off in the attachment step of the data driving unit 125 such that the plurality of mux signals Mu1, Mu2 and Mu3 are not transmitted to the plurality of mux test lines MTL and the plurality of mux test lines MTL have a floating state. As a result, a coupling between the plurality of data film lines DFL and the plurality of mux test lines MTL may be minimized and deterioration such as a line defect may be prevented.

Although not shown, the pad area PA may include a mux enable pad connected to the gate electrode of the plurality of mux enable transistors Tme, the FPC 290 may include a mux enable film line, and the mux enable film line of the FPC 290 may be connected to the mux enable pad of the display panel 140. A mux enable signal Me of a logic low level (Me(on)) may be transmitted from the mux enable film line of the FPC 290 to the gate electrode of the plurality of mux enable transistors Tme of the display panel 140 through the mux enable pad of the display panel 140.

In the display device 110 according to an embodiment of the present disclosure, the plurality of mux enable transistors Tme are disposed between the plurality of mux test lines MTL and the plurality of mux pads Pm. In the test step of a lighting, the plurality of mux enable transistors Tme are turned on, and the plurality of test mux signals Mu1, Mu2 and Mu3 are transmitted from the plurality of mux test pads Pmt of the test substrate 280 to the plurality of mux transistors Tm1, Tm2 and Tm3, respectively, of the display panel 140.

In the attachment step of the data driving unit 125 and the subsequent steps thereof, the plurality of mux signals Mu1, Mu2 and Mu3 are transmitted from the plurality of mux film lines MFL of the FPC 290 to the plurality of mux transistors Tm1, Tm2 and Tm3, respectively, of the display panel 140. However, since the plurality of mux enable transistors Tme are turned off, the plurality of mux signals Mu1, Mu2 and Mu3 are not transmitted from the plurality of mux film lines MFL of the FPC 290 to the plurality of mux test lines MTL of the display panel 140, and the plurality of mux test lines MTL have a floating state. As a result, a coupling between the plurality of data film lines DFL and the plurality of mux test lines MTL is minimized.

Consequently, in the test step of a lighting of the display device 110 according to an embodiment of the present disclosure, since the mux signal blocking unit selectively blocking the mux signal is disposed between the mux test line transmitting the mux signal and the mux pad receiving the mux signal, deterioration such as a line defect due to a coupling between the mux line and the film line is prevented.

Further, the mux signal blocking unit selectively blocking the mux signal is disposed between the mux line and the mux pad. Due to the mux signal blocking unit, the mux signal is transmitted in the test step of a lighting and is blocked after the data driving unit is attached. As a result, a coupling between the mux line and the film line is prevented, and a power consumption is reduced to obtain a low power driving.

It will be apparent to those skilled in the art that various modifications and variation may be made in the present disclosure without departing from the scope of the disclosure. Thus, it is intended that the present disclosure cover the modifications and variations of this disclosure provided they come within the scope of the appended claims and their equivalents.

What is claimed is:

1. A display device, comprising:

a timing controlling circuit generating an image data, a data control signal, and a gate control signal;

a data driving circuit generating a data signal using the image data and the data control signal;

a gate driving circuit generating a gate signal using the gate control signal; and a display panel displaying an image using the data signal and the gate signal and including a plurality of mux test lines, a plurality of mux enable transistors respectively connected to the plurality of mux test lines, a plurality of mux pads respectively connected to the plurality of mux enable transistors, a plurality of data pads connected to a plurality of data film lines of a flexible printed circuit to receive the data signal, a plurality of mux link lines respectively connected to the plurality of mux pads, and a plurality of mux transistors respectively connected to the plurality of mux link lines, wherein the plurality of mux test lines and the plurality of data film lines overlap each other, and wherein the plurality of mux link lines are respectively connected to gate electrodes of the plurality of mux transistors and are respectively connected to the plurality of mux enable transistors through the plurality of mux pads.

2. The display device of claim 1, wherein the display panel further includes a plurality of gate lines and a plurality of data lines crossing each other to define a plurality of subpixels, and the plurality of mux transistors respectively connected between the plurality of mux link lines and the plurality of data lines.

3. The display device of claim 2, wherein the plurality of mux transistors are switched according to a plurality of mux signals transmitted from the plurality of mux pads.

4. The display device of claim 3, wherein the display panel further includes a plurality of data link lines connected to the plurality of mux transistors, wherein the plurality of data pads are connected to the plurality of data link lines, and wherein the plurality of mux pads are connected to a plurality of mux film lines of the flexible printed circuit to receive the plurality of mux signals.

5. The display device of claim 4, wherein the plurality of mux enable transistors are turned on in a test step of a lighting and are turned off in an attachment step of the data driving circuit.

6. The display device of claim 5, wherein in the attachment step of the data driving circuit, the plurality of mux test lines have a floating state.

7. The display device of claim 4, wherein the display panel is divided into a display area and a non-display area at a periphery of the display area, wherein the plurality of subpixels, the plurality of data lines, and the plurality of gate lines are in the display area, and the plurality of data link lines and the plurality of mux transistors are in the non-display area.

8. The display device of claim 1, wherein the gate signal includes a first scan signal, a second scan signal, a first emission signal, and a second emission signal, wherein the display panel further includes a plurality of subpixels, and wherein each of the plurality of subpixels comprises:

a storage capacitor;

a first transistor switched according to a voltage of a first capacitor electrode of the storage capacitor;

a second transistor switched according to the second scan signal, the second transistor connected to the data signal and the first transistor;

a third transistor switched according to the first scan signal, the third transistor connected to the storage capacitor and the first transistor;

a fourth transistor switched according to the first scan signal, the fourth transistor connected to the storage capacitor and an initial signal;

a fifth transistor switched according to the second emission signal, the fifth transistor connected to a high-level signal and the first transistor;

a sixth transistor switched according to the first emission signal, the sixth transistor connected to the first transistor; and a light emitting diode connected to the sixth transistor and a low-level signal.

9. The display device of claim 8, wherein at least one of the first transistor to the sixth transistor is an oxide semiconductor thin film transistor.

10. The display device of claim 8, wherein the first transistor, the second transistor, the fifth transistor, and the sixth transistor are negative type low temperature polycrystalline silicon thin film transistors, and the third transistor and the fourth transistor are negative type oxide semiconductor thin film transistors.

11. The display device of claim 1, wherein the gate signal includes a first scan signal, a second scan signal, a first emission signal, and a second emission signal, wherein the gate driving circuit includes a first gate driving circuit and a second gate driving circuit disposed at both sides of the display panel, wherein the first gate driving circuit includes a second scan block generating the second scan signal and a second emission block generating the second emission signal, and wherein the second gate driving circuit includes a first scan block generating the first scan signal and a first emission block generating the first emission signal.

12. The display device of claim 11, wherein the second scan block is farther from the display panel than the second emission block or the second emission block is farther from the display panel than the second scan block, and wherein the first scan block is farther from the display panel than the first emission block or the first emission block is disposed farther from the display panel than the first scan block.

13. The display device of claim 11, wherein the display panel further includes a plurality of gate link lines connected to the first gate driving circuit and the second gate driving circuit and a plurality of gate pads connected to the plurality of gate link lines.

14. The display device of claim 13, wherein the plurality of gate pads are connected to a plurality of gate film lines of a flexible printed circuit which transmit the gate control signal.

15. The display device of claim 1, wherein gate electrodes of the plurality of mux enable transistors are connected to a plurality of mux enable pads of a test substrate respectively to receive a mux enable signal, drain electrodes of the plurality of mux enable transistors are connected to the plurality of mux test lines respectively, and source electrodes of the plurality of mux enable transistors are connected to the plurality of mux pads respectively.

16. The display device of claim 1, wherein the plurality of mux link lines transmit a plurality of mux signals switching the plurality of mux transistors.

17. A method of fabricating a display device, comprising:

forming a plurality of mux test lines, a plurality of mux enable transistors respectively connected to the plurality of mux test lines, and a plurality of mux pads respectively connected to the plurality of mux enable transistors on a display panel;

connecting a plurality of mux test pads of a test substrate to the plurality of mux test lines of the display panel by disposing the test substrate adjacent to the display panel;

performing a lighting test of the display panel by turning on the plurality of mux enable transistors and applying a plurality of mux signals from the test substrate to the plurality of mux pads;

connecting a plurality of mux film lines of a flexible printed circuit to the plurality of mux pads by attaching the flexible printed circuit to the display panel; and driving the display panel by turning off the plurality of mux enable transistors and applying a plurality of mux signals from the flexible printed circuit to the plurality of mux pads.

18. The method of claim 17, further comprising:

forming a plurality of gate lines and a plurality of data lines that cross each other and define a plurality of subpixels, a plurality of mux link lines respectively connected to the plurality of mux pads, and a plurality of mux transistors respectively connected between the plurality of mux link lines and the plurality of data lines on the display panel.

19. The method of claim 18, wherein the plurality of mux transistors are switched according to a plurality of mux signals transmitted from the plurality of mux pads.

20. The method of claim 19, further comprising:

forming a plurality of data link lines connected to the plurality of mux transistors and a plurality of data pads connected to the plurality of data link lines on the display panel, wherein the plurality of mux pads are connected to a plurality of mux film lines of a flexible printed circuit and receive the plurality of mux signals, and wherein the plurality of data pads are connected to a plurality of data film lines of the flexible printed circuit and receive a data signal.

* * * * *